US010216290B2

(12) United States Patent
Scandaliato et al.

(10) Patent No.: US 10,216,290 B2
(45) Date of Patent: Feb. 26, 2019

(54) GYROSCOPE APPARATUS (71) Applicant: Adtile Technologies Inc., San Diego, CA (US)

(72) Inventors: Angelo Scandaliato, San Diego, CA (US); Nils Forsblom, San Diego, CA (US); Maximilian Metti, San Diego, CA (US)

( * ) Notice: Subject to any disclaimer, the term of this patent is extended or adjusted under 35 U.S.C. 154(b) by 0 days.

(21) Appl. No.: 15/483,967

(22) Filed: Apr. 10, 2017

(65) Prior Publication Data
US 2017/0293368 A1 Oct. 12, 2017

Related U.S. Application Data (60) Provisional application No. 62/320,216, filed on Apr. 8, 2016.

(51) Int. Cl.
*G06F 3/0346* (2013.01)
*G01C 17/28* (2006.01)
*G01V 7/02* (2006.01)
*G01V 7/00* (2006.01)
*G06F 3/01* (2006.01)

(52) U.S. Cl.
CPC .......... *G06F 3/0346* (2013.01); *G01C 17/28* (2013.01); *G01V 7/00* (2013.01); *G01V 7/02* (2013.01); *G06F 3/017* (2013.01); *G06F 2200/1637* (2013.01)

(58) Field of Classification Search
CPC . G01C 17/28; G01V 7/02; G01V 7/00; G06F 2200/1637; G06F 3/017; G06F 3/0346
See application file for complete search history.

(56) References Cited

U.S. PATENT DOCUMENTS

| 5,432,699 | A | 7/1995 | Hache et al. |
| 8,631,358 | B2 | 1/2014 | Louch |
| 2007/0001888 | A1 | 1/2007 | Draxelmayr |
| 2007/0136132 | A1 | 6/2007 | Weiser et al. |
| 2009/0319166 | A1 | 12/2009 | Khosravy et al. |
| 2010/0257475 | A1 | 10/2010 | Smith et al. |

(Continued)

OTHER PUBLICATIONS

International Search Report and Written Opinion for PCT/US14/69554; dated Mar. 6, 2015; 11 pages.

(Continued)

*Primary Examiner* — Mischita L Henson
(74) *Attorney, Agent, or Firm* — Stetina Brunda Garred & Brucker (57) ABSTRACT A gyroscope apparatus for a device including an accelerometer and a magnetic component has a gravity vector generator connected to the accelerometer and receptive to acceleration readings therefrom. A magnetic component output generator is connected to the magnetic component and receptive to magnetic component readings. A sensor fusion engine is connected to the gravity vector generator and to the magnetic component output generator, with a gravity vector value and a magnetic field vector value at a first time instance being combined to represent a first orientation value. The gravity vector value and the magnetic field vector value at a second time instance are combined to represent a second orientation value. An orientation rate of change is derived from a difference between the first orientation value and the second orientation value.

35 Claims, 3 Drawing Sheets (56) References Cited

U.S. PATENT DOCUMENTS

| | | |
|---|---|---|
| 2010/0269030 A1 | 10/2010 | Dugonjic et al. |
| 2011/0173204 A1 | 7/2011 | Murillo et al. |
| 2011/0205375 A1 | 8/2011 | Molgaard |
| 2011/0270679 A1 | 11/2011 | Tziortzis et al. |
| 2012/0041767 A1 | 2/2012 | Hoffman et al. |
| 2012/0203487 A1* | 8/2012 | Johnson .................. G01P 21/00 702/104 |
| 2012/0246596 A1 | 9/2012 | Ording et al. |
| 2012/0310717 A1 | 12/2012 | Kankainen |
| 2013/0159350 A1* | 6/2013 | Sankar .................... G06F 3/011 707/784 |
| 2014/0195804 A1 | 7/2014 | Hursti |
| 2014/0202229 A1* | 7/2014 | Stanley ................ G01C 25/005 73/1.79 |
| 2014/0280517 A1 | 9/2014 | White et al. |
| 2014/0288873 A1* | 9/2014 | Czompo ............ G01C 19/5776 702/141 |
| 2015/0286279 A1 | 10/2015 | Lim et al. |
| 2015/0304652 A1 | 10/2015 | Spas |
| 2016/0094766 A1 | 3/2016 | Stanely |

OTHER PUBLICATIONS

David Talbot, What Apple's M7 Motion-Sensing Chip Could Do, Sep. 25, 2013, 2 pages.
Chris Brandrick, Apple's M7 Chip Is the Trojan Horse for Its Wearable Computing Plans, Sep. 13, 2013, 7 pages.
International Search Report and Written Opinion for PCT/US17/026863; dated Jun. 19, 2017.

\* cited by examiner

GYROSCOPE APPARATUS

CROSS-REFERENCE TO RELATED APPLICATIONS

This application relates to and claims the benefit of U.S. Provisional Application No. 62/320,216 filed Apr. 8, 2016 and entitled "SOFTWARE GYROSCOPE APPARATUS," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to mobile communications devices and human-computer interfaces therefor including integrated sensors, and more particularly to a gyroscope apparatus.

2. Related Art

Mobile devices fulfill a variety of roles, from voice communications and text-based communications such as Short Message Service (SMS) and e-mail, to calendaring, task lists, and contact management, as well as typical Internet based functions such as web browsing, social networking, online shopping, and online banking. With the integration of additional hardware components, mobile devices can also be used for photography or taking snapshots, navigation with mapping and Global Positioning System (GPS), cashless payments with NFC (Near Field Communications) point-of-sale terminals, and so forth. Such devices have seen widespread adoption in part due to the convenient accessibility of these functions and more from a single portable device that can always be within the user's reach.

Although mobile devices can take on different form factors with varying dimensions, there are several commonalities between devices that share this designation. These include a general purpose data processor that executes pre-programmed instructions, along with wireless communication modules by which data is transmitted and received. The processor further cooperates with multiple input/output devices, including combination touch input display screens, audio components such as speakers, microphones, and related integrated circuits, GPS modules, and physical buttons/input modalities. More recent devices also include accelerometers, gyroscopes, and compasses that can sense motion and direction. For portability purposes, all of these components are powered by an on-board battery. In order to accommodate the low power consumption requirements, Advanced Reduced Instruction Set Computing Machine ARM architecture processors have been favored for mobile devices. Several distance and speed-dependent communication protocols may be implemented, including longer range cellular network modalities such as GSM (Global System for Mobile communications), Code Division Multiple Access (CDMA), and so forth, high speed local area networking modalities such as WiFi, and close range device-to-device data communication modalities such as Bluetooth.

Management of these hardware components is performed by a mobile operating system, also referenced in the art as a mobile platform. Currently, popular mobile platforms include Android from Google, Inc., iOS from Apple, Inc., and Windows Phone, from Microsoft, Inc. These three platforms account for over 98.6% share of the domestic U.S. market.

The mobile operating system provides several fundamental software modules and a common input/output interface that can be used by third party applications via application programming interfaces. This flexible development environment has led to an explosive growth in mobile software applications, also referred to in the art as "apps." Third party apps are typically downloaded to the target device via a dedicated app distribution system specific to the platform. Although apps are executed locally on the device, their functionality and utility may be significantly enhanced with data retrieved from remote sources. Indeed, many apps function as mobile-specific interfaces to web-based application services.

Yet, notwithstanding the availability of device-native apps for the most popular web applications, users continue to rely on general-purpose web browsers installed on the mobile devices to access websites. When accessed from a mobile web browser app, alternative interfaces with larger fonts and simplified layouts that are more suitable for viewing content from the smaller display area of a mobile communications device may be presented.

User interaction with the mobile device, including the invoking of the functionality of these applications and websites, and the presentation of the results therefrom, is, for the most part, restricted to the graphical touch user interface. That is, the extent of any user interaction is limited to what can be displayed on the screen, and the inputs that can be provided to the touch interface are similarly limited to what can be detected by the touch input panel. Touch interfaces in which users press, tap, slide, flick, pinch regions of the sensor panel overlaying the displayed graphical elements with one or more fingers, particularly when coupled with corresponding animated display reactions responsive to such actions, may be more intuitive than conventional keyboard and mouse input modalities associated with personal computer systems. Thus, minimal training and instruction is required for the user to operate these devices.

However, as noted previously, mobile devices must have a small footprint for portability reasons. Depending on the manufacturer's specific configuration, the screen may be three to five inches diagonally. One of the inherent usability limitations associated with mobile devices is the reduced screen size; despite improvements in resolution allowing for smaller objects to be rendered clearly, buttons and other functional elements of the interface nevertheless occupy a large area of the screen. Accordingly, notwithstanding the enhanced interactivity possible with multi-touch input gestures, the small display area remains a significant restriction of the mobile device user interface.

Expanding beyond the confines of the touch interface, the integrated motion sensors, that is, micro electro-mechanical systems or MEMS, have been utilized as an input means. Some applications such as games are suited for motion-based controls, and typically utilize roll, pitch, and yaw rotations applied to the mobile device as inputs that control an on-screen element. Along these lines, more recent remote controllers for video game console systems also have incorporated accelerometers such that motion imparted to the controller is translated to a corresponding virtual action displayed on-screen. Additionally, motion sensors may be used to switch from portrait to landscape views, and vice versa, while rotating and resizing the entire viewable content. Three-axis accelerometers, 3-axis magnetometers, and 3-axis gyroscopes, all of which may be integrated into a single modular unit, are examples MEMS sensor devices. Additionally, the integrated circuit may include a motion co-processor that gathers the sensor signals and derives usable motion data therefrom.

Although motion sensors are almost universally incorporated into mid to high-end handheld and wearable devices, due to its increased manufacturing costs and size restrictions, some low-end devices do not incorporate these sensors. These devices are typically marketed across large populations in developing regions such as Africa, India, and China for under $50, and accordingly have a wide user base therein. Such low-cost devices are also widely available domestically.

Moreover, miniaturization of the MEMS modules have allowed for integration into mobile communications devices, but they may still be too large for wearable devices such as headsets, watches, health tracking devices, augmented reality (AR) and virtual reality (VR) devices, sensor-enabled clothing, and so forth. Proper placement of the MEMS modules in the limited space of these platforms, particularly where other critical components are needed, may also be restricted.

Accordingly, there is a need in the art for a gyroscope apparatus by which motion sensing capabilities and interactivity based on motion inputs may be implemented on inexpensive mobile devices and wearable devices without a hardware gyroscope sensor module. There is also a need in the art for embedding a full motion sensing system at reasonable cost, so that motion-based interactivity may be widely disseminated.

BRIEF SUMMARY

The present disclosure is directed to a gyroscope apparatus in which a three-axis gyroscope hardware is replaced with a software implementation thereof employing a three-axis accelerometer and a three-axis magnetometer. Generally, the functionality of a MEMS gyroscope is emulated, and rotational rate of change data may be derived without the attendant costs of a hardware gyroscope.

One embodiment contemplates a gyroscope apparatus for a device including an accelerometer and a magnetic component. There may be a gravity vector generator connected to the accelerometer and receptive to acceleration readings therefrom at a first time instance and at a second time instance. Gravity vector values may be extracted from the acceleration readings. There may also be a magnetic component output generator connected to the magnetic component and receptive to magnetic component readings therefrom at the first time instance and at the second time instance. Magnetic field vector values may be extracted from the magnetic component readings. The gyroscope apparatus may also include a sensor fusion engine connected to the gravity vector generator and to the magnetic component output generator. The gravity vector value and the magnetic field vector value at the first time instance may be combined to represent a first orientation value. The gravity vector value and the magnetic field vector value at the second time instance may be combined to represent a second orientation value. An orientation rate of change may be derived from a difference between the first orientation value and the second orientation value.

Another embodiment of the present disclosure is directed to a method for simulating a gyroscope with a hardware device including an accelerometer and a magnetic component. The method may include extracting a first gravity vector reading from the accelerometer at a first time instance. Concurrently with the extraction of the first gravity vector reading, the method may include extracting a first magnetic component reading from the magnetic component at the first time instance. There may also be a step of combining the concurrently extracted first gravity vector reading and the first magnetic component reading into a first device orientation value. The method may further include extracting a second gravity vector reading from the accelerometer at a second time instance different from the first time instance. Concurrently with the extraction of the second gravity vector reading, there may be a step of extracting a second magnetic component reading from the magnetic component at the second time instance. The method may further include combining the concurrently extracted second gravity vector reading and the second magnetic component reading into a second device orientation value. There may also be a step of deriving a rotational rate of change from a difference between the first device orientation value and the second device orientation value.

Certain other embodiments of the present disclosure contemplate respective computer-readable program storage media that each tangibly embodies one or more programs of instructions executable by a data processing device to perform the foregoing methods. The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a gyroscope apparatus. The detailed description set forth below in connection with the appended drawings is intended as a description of the several presently contemplated embodiments of these apparatuses, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
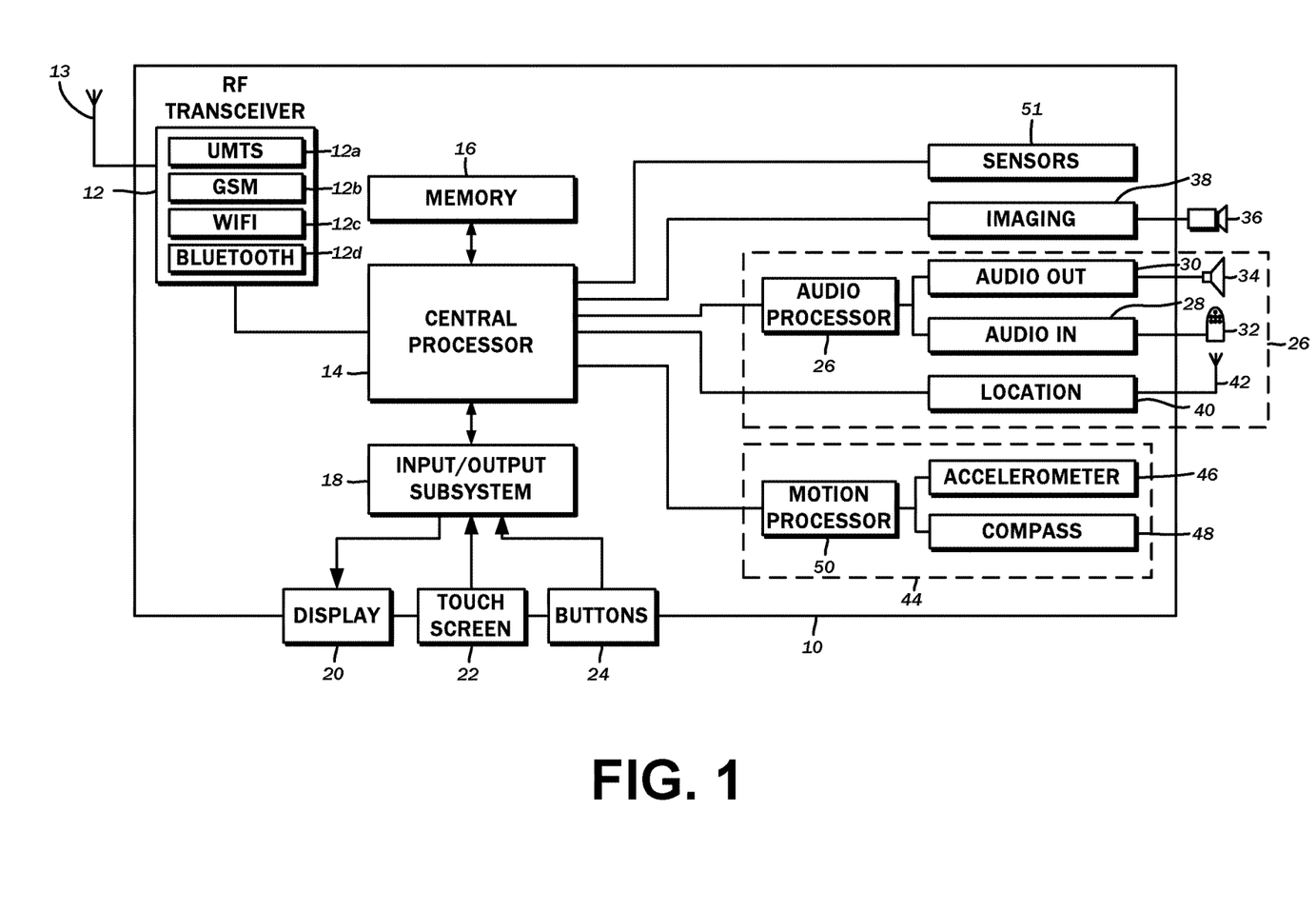
FIG. 1 is a block diagram illustrating the various hardware components of an exemplary mobile communications device that may be utilized in connection with the embodiments of the present disclosure.

FIG. 1 illustrates one exemplary mobile communications device 10 on which various embodiments of the present disclosure may be implemented. The mobile communications device 10 may be a smartphone, and therefore include a radio frequency (RF) transceiver 12 that transmits and receives signals via an antenna 13. Conventional devices are capable of handling multiple wireless communications modes simultaneously. These include several digital phone modalities such as UMTS (Universal Mobile Telecommunications System), 4G LTE (Long Term Evolution), and the like. For example, the RF transceiver 12 includes a UMTS module 12a. To the extent that coverage of such more advanced services may be limited, it may be possible to drop down to a different but related modality such as EDGE (Enhanced Data rates for GSM Evolution) or GSM (Global System for Mobile communications), with specific modules therefor also being incorporated in the RF transceiver 12, for example, GSM module 12b. Aside from multiple digital phone technologies, the RF transceiver 12 may implement other wireless communications modalities such as WiFi for local area networking and accessing the Internet by way of local area networks, and Bluetooth for linking peripheral devices such as headsets. Accordingly, the RF transceiver may include a WiFi module 12c and a Bluetooth module 12d. The enumeration of various wireless networking modules is not intended to be limiting, and others may be included without departing from the scope of the present disclosure.

The mobile communications device 10 is understood to implement a wide range of functionality through different software applications, which are colloquially known as "apps" in the mobile device context. The software applications are comprised of pre-programmed instructions that are executed by a central processor 1 and that may be stored on a memory 16. The results of these executed instructions may be output for viewing by a user, and the sequence/parameters of those instructions may be modified via inputs from the user. To this end, the central processor 14 interfaces with an input/output subsystem 18 that manages the output functionality of a display 20 and the input functionality of a touch screen 22 and one or more buttons 24.

In a conventional smartphone device, the user primarily interacts with a graphical user interface that is generated on the display 20 and includes various user interface elements that can be activated based on haptic inputs received on the touch screen 22 at positions corresponding to the underlying displayed interface element. One of the buttons 24 may serve a general purpose escape function, while another may serve to power up or power down the mobile communications device 10. Additionally, there may be other buttons and switches for controlling volume, limiting haptic entry, and so forth. Those having ordinary skill in the art will recognize other possible input/output devices that could be integrated into the mobile communications device 10, and the purposes such devices would serve. Other smartphone devices may include keyboards (not shown) and other mechanical input devices.

The mobile communications device 10 includes several other peripheral devices. One of the more basic is an audio subsystem 26 including an audio input 28 and an audio output 30 that allows the user to conduct voice telephone calls. The audio input 28 is connected to a microphone 32 that converts sound to electrical signals, and may include amplifier and ADC (analog to digital converter) circuitry that transforms the continuous analog electrical signals to digital data. Furthermore, the audio output 30 is connected to a loudspeaker 34 that converts electrical signals to air pressure waves that result in sound, and may likewise include amplifier and DAC (digital to analog converter) circuitry that transforms the digital sound data to a continuous analog electrical signal that drives the loudspeaker 34. The audio input and output may be handled by an audio processor 27. Furthermore, it is possible to capture still images and video via a camera 36 that is managed by an imaging module 38.

Due to its inherent mobility, users can access information and interact with the mobile communications device 10 practically anywhere. Additional context in this regard is discernible from inputs pertaining to location, movement, and physical and geographical orientation, which further enhance the user experience. Accordingly, the mobile communications device 10 includes a location module 40, which may be a Global Positioning System (GPS) receiver that is connected to a separate antenna 42 and generates coordinates data of the current location as extrapolated from signals received from the network of GPS satellites.

Motions imparted upon the mobile communications device 10, as well as the physical and geographical orientation of the same, may be captured as data with a motion subsystem 44. In the embodiment illustrated, the motion subsystem 44 includes an accelerometer 46 and a compass 48, which is typical of lower cost devices 10 that specifically omit a hardware gyroscope. Although in some embodiments the accelerometer 46 and the compass 48 directly communicate with the central processor 14, more recent variations of the mobile communications device 10 utilize a separate motion co-processor 50 to which the acceleration and direction processing is offloaded for greater efficiency and reduced electrical power consumption.

The components of the motion subsystem 44, including the accelerometer 46 and the compass 48, while shown as integrated into the mobile communications device 10, may be incorporated into a separate, external device. This external device may be wearable by the user and communicatively linked to the mobile communications device 10 over the aforementioned data link modalities. The same physical interactions contemplated with the mobile communications device 10 to invoke various functions as discussed in further detail below may be possible with such external wearable device.

There are other sensors 51 that can be utilized in the mobile communications device 10 for different purposes. For example, one of the other sensors 51 may be a proximity sensor to detect the presence or absence of the user to invoke certain functions, while another may be a light sensor that adjusts the brightness of the display 20 according to ambient light conditions. Those having ordinary skill in the art will recognize that other sensors 51 beyond those considered herein are also possible.

The present disclosure is directed to utilizing a combination of available motion sensors in the motion subsystem 44 of a mobile device 10, for example, the accelerometer 46 and the compass 48, and additional processing of readings from such available sensors to replace a hardware gyroscope. Referring to the block diagram of FIG. 2, a gyroscope system or apparatus 52 is generally comprised of an accelerometer module 54 that captures, processes, and reports data from the accelerometer 46, along with a magnetic component module 56 that similarly captures, processes, and reports data from magnetic component hardware 58.

Figure 2:
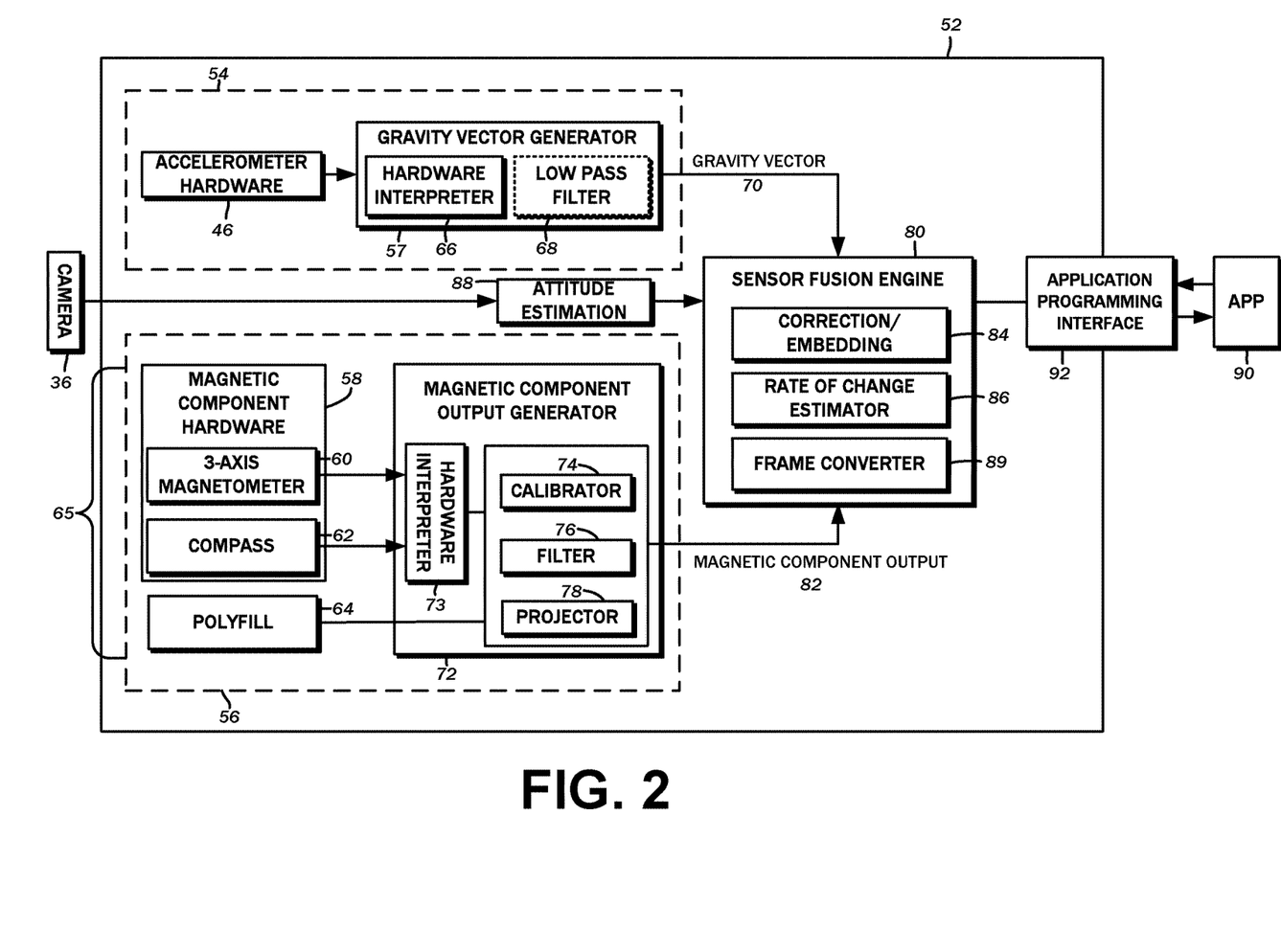
FIG. 2 is a block diagram of a gyroscope apparatus in accordance with one embodiment.

The accelerometer module 54 is understood to encompass the hardware of the accelerometer 46, along with various functional modules that may be implemented as a series of software instructions executed by the central processor 14. The magnetic component module 56 likewise encompasses the hardware 58, which may be a three-axis magnetometer 60, or alternatively, a single-axis compass 62. In some implementations, there may be a three-axis magnetometer 60 present within the device, but a soft compass may be implemented using such multi-axis magnetometer and limit the availability of data pertaining to the other axes. In some devices, the magnetometer hardware 58 may be entirely omitted, in which case various embodiments of the present disclosure contemplate a polyfill engine 64 that outputs data based upon certain assumptions and which allow device orientation to be calculated. Each of these components may be generally referred to as a magnetic component 65. The magnetic component module 56 is also understood to include several software-implemented functional modules that utilize the data generated by the hardware.

The functionalities of the different subcomponents of the gyroscope apparatus 52 will be described in further detail below, and it will be appreciated that the attribution of functions to the hardware devices and to the software modules is presented by way of example only. It will be appreciated that functionality described herein as being performed by a hardware element may also be performed by a software element, and vice versa, though one having ordinary skill in the art will also appreciate those functions that are conventionally implemented in hardware versus those functions that are conventionally implemented in software. Along these lines, while some components are illustrated as standalone, while other components are illustrated as being a subcomponent of or subsidiary to another component, such divisions are likewise presented by way of example only.

The accelerometer module 54 includes a gravity vector generator 57, which captures sensor readings from the accelerometer hardware 46. According to one embodiment, the accelerometer 46 is a three-axis micro-electro-mechanical sensor that measures and reports acceleration along the x, y, and z axes. The reported acceleration data is understood to provide the total acceleration vector in the device frame, and is captured and processed by a hardware interpreter 66 that is part of the gravity vector generator 58. The hardware interpreter 66 is understood to capture the continuous electrical signals output by the accelerometer hardware 46, and quantifies the same into usable numerical values. The accelerometer readings are captured on a periodic basis over multiple time instances, and the data may be generated in terms of time-coded values or as a sequence of readings with a known sampling rate. The gravity vector generator 57 also includes a low pass filter 68 that removes the dynamic acceleration from the accelerometer readings, leaving the static acceleration, which is the force corresponding to gravity. From such gravity vector readings over multiple instances of time, the rate of change in gravity direction can be calculated. The output of the gravity vector generator 57, and more particularly the low pass filter 68 will be referred to as the gravity vector values 70, and is understood to cover to of the three axes needed to ascertain rotation.

As indicated above, the magnetic component module 56 includes the magnet component hardware 58, which reports a total magnetic field vector along three axes at a given time instant. The magnetic component module 56 also includes a magnetic component output generator 72 that queries the magnetic components 65 for multiple readings (magnetic field vectors) over sequential time instances. This readings are understood to relate to the last axis of rotation to determine device orientation. The magnetic component output generator 72 thus includes a hardware interpreter 73 that captures the electrical signals output by the magnetic component hardware 58, and translates the same to usable data representative of the readings.

The magnetic component output generator 72 further includes a calibrator 74 that is connected to the magnetic component hardware 58 that determines a degree of compensation to be applied to the readings based upon separating the internal and external contributions to the magnetic field. Once a correction factor is calculated, it is applied to each reading to correct its value relative to the calibration point. The magnetic component module 56 further includes a filter 76 that removes components of the magnetic field vector values corresponding to local magnetic disturbances.

In addition to the calibrator 74 and the filter 76, there is also a magnetic field projector 78 that is part of the magnetic component module 56 and connected to the magnetic component 64. The magnetic field projector 78 projects the received magnetic field vector into the horizontal plane given by gravity. The remaining angle is understood to correspond to the heading in the direction of magnetic north. Using multiple magnetic field vector readings over multiple time instances, the rate of change in the north heading can be ascertained.

A sensor fusion engine 80 is connected to the output of the accelerometer module 54 and the magnetic component module 56. The time series gravity vector values 70 and the time series magnetic component values 82 are combined to yield a device orientation. Prior to processing this combination, however, a correction or embedding process 84 may be applied. With magnetic component readings output from an actual three-axis magnetometer 60, a correction operation may be applied. With magnetic component readings output from a single-axis hardware compass, or from a software-implemented compass using data from a three-axis magnetometer 60, there may be an additional step of embedding the values into a three-axis magnetometer form.

Over multiple values from both the accelerometer module 54 and the compass module 56, the rate of change in orientation can be determined by a corresponding module 86. The orientation, as well as the orientation rate of change, are understood to be relative to the world frame defined by gravity and north. A frame converter 89 converts the rate of change from the world frame to be relative to the device frame.

Further refinements to the accuracy of the gravity vector 70 as output by the accelerometer module 54, and the accuracy of the magnetic component output 82 are possible with data from the camera 36. The camera 36 may provide additional motion-related data, wherein attitude estimates can be used to bolster computed directions of the gravity and magnetic north vectors using various methods, such as horizon detection algorithms or general feature matching across frames captured by the camera 36. Such methods provide redundant information to estimating the direction of gravity, as well as information for encoding a given compass heading angle into a triaxial magnetic north direction. Alternatively, a correction to a given magnetic component reading is possible. The data may be captured via an attitude estimator 88. Further processing can take place in the sensor fusion engine 80, or be applied to the magnetometer direction estimation and gravity direction estimation directly. It is also possible to eliminate the accelerometer module 54 to the extent the camera 36 is exclusively utilized to provide gravity vector data, rather than for redundancy purposes.

As indicated above, the gyroscope apparatus 52 may be running on the mobile communications device 10, and the data generated thereby may be utilized by an external application 90. In one implementation, the external application 90 may periodically request the orientation data as needed, and utilize the reported information to affect the functionality thereof. For example, in a three-dimensional "augmented reality" interface, physical movement of the mobile communications device may be interpreted accordingly by the accelerometer 46, the magnetic component 65, and the gyroscope apparatus 52, and display graphical elements may be re-positioned in response to the movement, the degree and extent of which is in accordance with the orientation information. Those having ordinary skill in the art will recognize the many other ways in which gyroscope/orientation data may be utilized in an interactive application 90. In order to provide a common interface to multiple applications 90, the gyroscope apparatus 52 may include an application programming interface 92, through which a request for orientation data can be made, as well as the responsive orientation data can be passed back to the application 90. In embodiments where the polyfill engine 64 is utilized to provide magnetic component outputs, the application 90 itself may provide such values for further processing by the magnetic component output generator 72.

Figure 3:
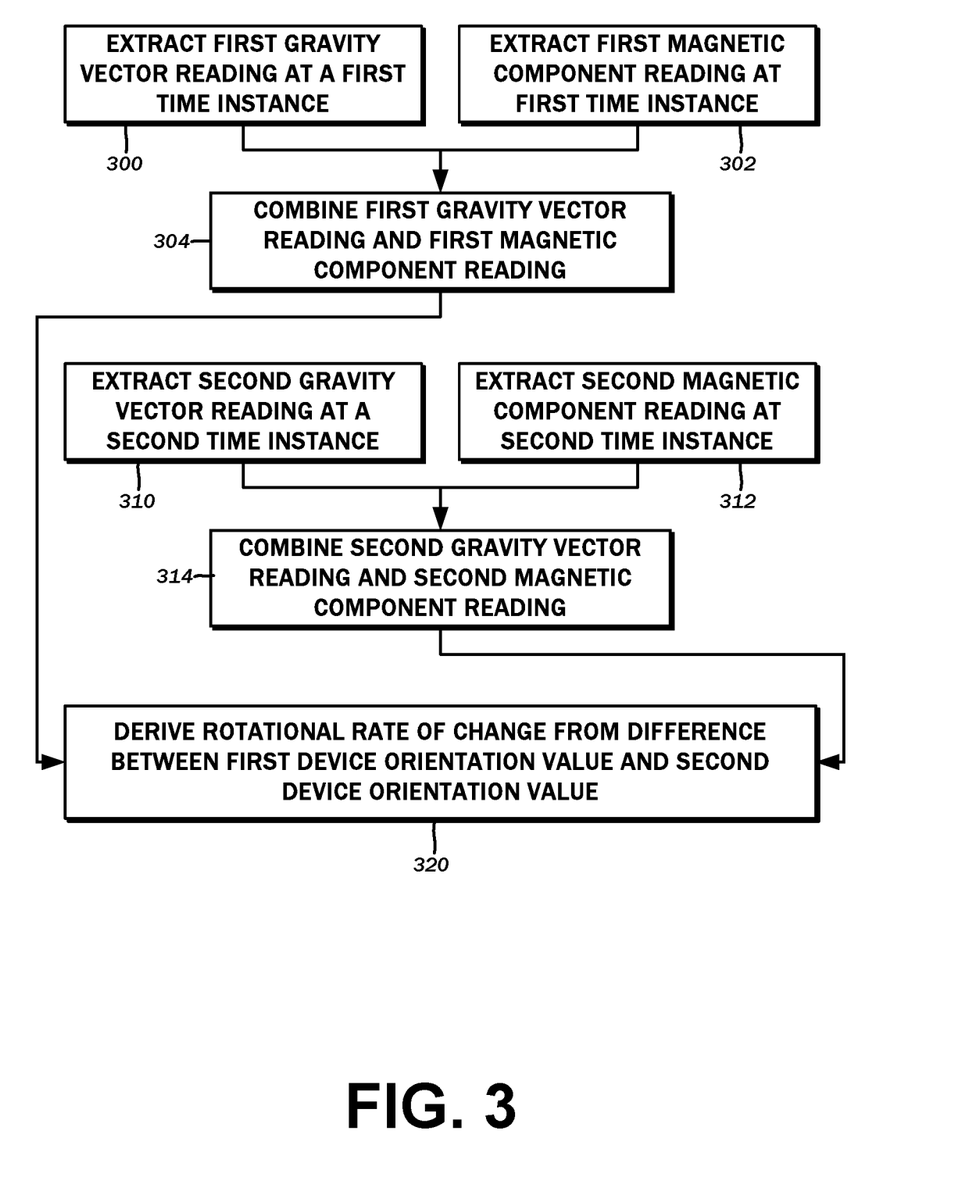
FIG. 3 is a flowchart depicting a method for simulating a gyroscope with a hardware accelerometer and magnetometer.

Referring now to the flowchart of FIG. 3, according to another embodiment of the present disclosure, a method for simulating a gyroscope is also contemplated. The method may begin with a step 300 of extracting a first gravity vector reading from the accelerometer 46 at a first time instance. This step may be performed by the gravity vector generator 58 in the manner described above. Along these lines, the low pass filter 60 may be applied to the first gravity vector readings, which as explained previously, removes the dynamic acceleration components.

There is also a step 302 of extracting a first magnetic component reading from the magnetic components 65. This is understood to take place at the first time instance as the step 300 of extracting the first gravity vector reading from the accelerometer 46. The extraction of the first magnetic north heading reading is also understood to encompass the aforementioned calibration, filtering, and projecting procedures. The first gravity vector reading and the first magnetic component reading from the first time instance are combined into a first device orientation value in a step 304. This step may be performed by the sensor fusion engine 70 in various embodiments.

Steps 300-304 are repeated at a second time instance. Specifically, there is a step 310 of extracting a second gravity vector reading at a second time instance, and a concurrent step 312 of extracting a second magnetic component reading at the second time instance. Thereafter, in a step 314, the second gravity vector reading and the second magnetic component reading are combined into a second orientation value.

The extraction of the gravity vector readings and magnetic component readings may be repeated an arbitrary number of times to build up a sufficient corpus of data to reliably derive orientation data. Upon collecting enough data points, the method continues with a step 320 of deriving a rotational rate of change from a difference between the first device orientation value and the second device orientation value. This data may be output via the application programming interface 76, either automatically on a periodic basis, or in response to a request received via the application programming interface 76.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. A gyroscope apparatus for a device including an accelerometer and a magnetic component, the apparatus comprising:
   a gravity vector generator connected to the accelerometer and receptive to acceleration readings therefrom at a first time instance and at a second time instance, gravity vector values being extracted from the acceleration readings;
   a magnetic component output generator connected to the magnetic component and receptive to magnetic component readings therefrom at the first time instance and at the second time instance, magnetic field vector values being extracted from the magnetic component readings, the magnetic component being a polyfill engine generating the magnetic component readings based upon predetermined assumptions; and
   a sensor fusion engine connected to the gravity vector generator and to the magnetic component output generator, the gravity vector value and the magnetic field vector value at the first time instance being combined to represent a first orientation value, and the gravity vector value and the magnetic field vector value at the second time instance being combined to represent a second orientation value, an orientation rate of change being derived from a difference between the first orientation value and the second orientation value.

2. The gyroscope apparatus of claim 1, wherein the gravity vector generator includes a low pass filter that removes dynamic acceleration components of the gravity vector values, with static acceleration components of the gravity vector values remaining.

3. The gyroscope apparatus of claim 1, further comprising:
   a calibrator connected to the magnetic component, magnetic component readings being adjusted by a calibration factor prior to the magnetic field vector values being extracted.

4. The gyroscope apparatus of claim 1, further comprising:
   a filter connected to the magnetic component, selected components of magnetic field vector values corresponding to local magnetic disturbances being removed by the filter.

5. The gyroscope apparatus of claim 1, further comprising:
   a magnetic field projector connected to the magnetic component, the magnetic field vector values being projected onto a horizontal plane, with a remaining angle corresponding to a heading relative to magnetic north.

6. The gyroscope apparatus of claim 1, further comprising:

a frame converter included in the sensor fusion engine; wherein the orientation rate of change is converted to be defined relative to either one of a device frame or a world frame.

7. The gyroscope apparatus of claim 1, further comprising:
an application programming interface receptive to requests from an external application for device orientation values;
wherein in response to the requests, the application programming interface invokes the sensor fusion engine to generate the first orientation value, the second orientation value, and the orientation rate of change.

8. The gyroscope apparatus of claim 7, further comprising a camera in communication with the sensor fusion engine.

9. The gyroscope apparatus of claim 7, wherein the application programming interface outputs the orientation rate of change to the requesting external application.

10. The gyroscope apparatus of claim 8, wherein a correction is applied to the gravity vector values based upon data from the camera.

11. The gyroscope apparatus of claim 10, wherein the correction applied to the gravity vector values is propagated to the magnetic field vector values.

12. A gyroscope apparatus for a device including an accelerometer and a magnetic component, the apparatus comprising:
a gravity vector generator connected to the accelerometer and receptive to acceleration readings therefrom at a first time instance and at a second time instance, gravity vector values being extracted from the acceleration readings;
a magnetic component output generator connected to the magnetic component and receptive to magnetic component readings therefrom at the first time instance and at the second time instance, magnetic field vector values being extracted from the magnetic component readings;
a magnetic field projector connected to the magnetic component, the magnetic field vector values being projected onto a horizontal plane, with a remaining angle corresponding to a heading relative to magnetic north,
a sensor fusion engine connected to the gravity vector generator and to the magnetic component output generator, the gravity vector value and the magnetic field vector value at the first time instance being combined to represent a first orientation value, and the gravity vector value and the magnetic field vector value at the second time instance being combined to represent a second orientation value, an orientation rate of change being derived from a difference between the first orientation value and the second orientation value.

13. The gyroscope apparatus of claim 12, wherein the magnetic component is a three-axis magnetometer.

14. The gyroscope apparatus of claim 12, wherein the magnetic component is a compass.

15. The gyroscope apparatus of claim 12, wherein the gravity vector generator includes a low pass filter that removes dynamic acceleration components of the gravity vector values, with static acceleration components of the gravity vector values remaining.

16. The gyroscope apparatus of claim 12, further comprising:
a calibrator connected to the magnetic component, magnetic component readings being adjusted by a calibration factor prior to the magnetic field vector values being extracted.

17. The gyroscope apparatus of claim 12, further comprising:
a filter connected to the magnetic component, selected components of magnetic field vector values corresponding to local magnetic disturbances being removed by the filter.

18. The gyroscope apparatus of claim 12, further comprising:
a frame converter included in the sensor fusion engine; wherein the orientation rate of change is converted to be defined relative to either one of a device frame or a world frame.

19. The gyroscope apparatus of claim 12, further comprising:
an application programming interface receptive to requests from an external application for device orientation values;
wherein in response to the requests, the application programming interface invokes the sensor fusion engine to generate the first orientation value, the second orientation value, and the orientation rate of change.

20. The gyroscope apparatus of claim 19, wherein the application programming interface outputs the orientation rate of change to the requesting external application.

21. The gyroscope apparatus of claim 20, wherein a correction is applied to the gravity vector values based upon data from the camera.

22. The gyroscope apparatus of claim 21, wherein the correction applied to the gravity vector values is propagated to the magnetic field vector values.

23. The gyroscope apparatus of claim 12, further comprising a camera in communication with the sensor fusion engine.

24. A gyroscope apparatus for a device including an accelerometer and a magnetic component, the apparatus comprising:
a gravity vector generator connected to the accelerometer and receptive to acceleration readings therefrom at a first time instance and at a second time instance, gravity vector values being extracted from the acceleration readings;
a magnetic component output generator connected to the magnetic component and receptive to magnetic component readings therefrom at the first time instance and at the second time instance, magnetic field vector values being extracted from the magnetic component readings;
a sensor fusion engine connected to the gravity vector generator and to the magnetic component output generator, the gravity vector value and the magnetic field vector value at the first time instance being combined to represent a first orientation value, and the gravity vector value and the magnetic field vector value at the second time instance being combined to represent a second orientation value, an orientation rate of change being derived from a difference between the first orientation value and the second orientation value; and
a frame converter included in the sensor fusion engine; wherein the orientation rate of change is converted to be defined relative to either one of a device frame or a world frame.

25. The gyroscope apparatus of claim 24, wherein the magnetic component is a three-axis magnetometer.

26. The gyroscope apparatus of claim 24, wherein the magnetic component is a compass.

27. The gyroscope apparatus of claim 24, wherein the gravity vector generator includes a low pass filter that removes dynamic acceleration components of the gravity vector values, with static acceleration components of the gravity vector values remaining.

28. The gyroscope apparatus of claim 24, further comprising:
a calibrator connected to the magnetic component, magnetic component readings being adjusted by a calibration factor prior to the magnetic field vector values being extracted.

29. The gyroscope apparatus of claim 24, further comprising:
a filter connected to the magnetic component, selected components of magnetic field vector values corresponding to local magnetic disturbances being removed by the filter.

30. The gyroscope apparatus of claim 24, further comprising:
a magnetic field projector connected to the magnetic component, the magnetic field vector values being projected onto a horizontal plane, with a remaining angle corresponding to a heading relative to magnetic north.

31. The gyroscope apparatus of claim 24, further comprising:
an application programming interface receptive to requests from an external application for device orientation values;
wherein in response to the requests, the application programming interface invokes the sensor fusion engine to generate the first orientation value, the second orientation value, and the orientation rate of change.

32. The gyroscope apparatus of claim 31, wherein the application programming interface outputs the orientation rate of change to the requesting external application.

33. The gyroscope apparatus of claim 24, further comprising a camera in communication with the sensor fusion engine.

34. The gyroscope apparatus of claim 33, wherein a correction is applied to the gravity vector values based upon data from the camera.

35. The gyroscope apparatus of claim 34, wherein the correction applied to the gravity vector values is propagated to the magnetic field vector values.

* * * * *